United States Patent [19]

Sauer

[11] Patent Number: 4,969,667
[45] Date of Patent: Nov. 13, 1990

[54] HOSE COUPLING

[75] Inventor: Heinz Sauer, Ronneburg, Fed. Rep. of Germany

[73] Assignee: Rasmussen GmbH, Maintal, Fed. Rep. of Germany

[21] Appl. No.: 345,680

[22] Filed: May 1, 1989

[30] Foreign Application Priority Data

May 4, 1988 [DE] Fed. Rep. of Germany ....... 3815172

[51] Int. Cl.$^5$ .............................................. F16L 33/20
[52] U.S. Cl. ................................... 285/256; 285/319; 285/921
[58] Field of Search ............... 285/256, 259, 253, 174, 285/319, 320, 921, 242, 239; 138/109

[56] References Cited

U.S. PATENT DOCUMENTS

| | | | |
|---|---|---|---|
| 1,253,309 | 1/1918 | Ulleland | 285/320 X |
| 3,603,621 | 9/1971 | Parsons | 285/921 X |
| 3,711,125 | 1/1973 | Dehar | 285/319 X |
| 4,486,034 | 12/1984 | Sauer | 285/319 X |
| 4,682,798 | 7/1987 | Sauer | 285/320 X |
| 4,730,856 | 3/1988 | Washizu | 285/921 X |
| 4,753,459 | 6/1980 | Potier | 285/253 |

FOREIGN PATENT DOCUMENTS

| | | | |
|---|---|---|---|
| 212881 | 4/1957 | Australia | 285/253 |
| 119043 | 1/1959 | U.S.S.R. | 285/256 |

*Primary Examiner*—Dave W. Arola
*Attorney, Agent, or Firm*—Peter K. Kontler

[57] ABSTRACT

A coupling for sealingly connecting an end portion of a hose to a nipple at one end of a pipe has a sleeve with a first section which surrounds the nipple and a separately produced second section which is form-lockingly connected with the first section and is received in the end portion of the hose when the coupling is assembled. The first section has a washer-like portion which is integral with axially extending prongs engaging a single ring-shaped protuberance or discrete tooth-shaped protuberances at the exterior of the nipple. The second section of the sleeve has an internal groove for a sealing ring which engages the external surface of the nipple. A tubular clamping member is shrunk onto the end portion of the hose and surrounds the second section of the sleeve.

9 Claims, 1 Drawing Sheet

HOSE COUPLING

CROSS-REFERENCE TO RELATED CASES

The hose coupling of the present invention is similar to those which are disclosed in six commonly owned copending patent applications Ser. Nos. 345,635, 345,652, 345,636, 345,632, 345,633 and 345,679 of Heinz Sauer, all filed May 1, 1989.

BACKGROUND OF THE INVENTION

The invention relates to couplings in general, especially to hose couplings, and more particularly to improvements in couplings wherein one end portion of a first tubular component (e.g., the nipple at one end of a metallic or plastic pipe) can be separably connected with one end portion of a second tubular component (such as an elastically deformable hose). Still more particularly, the invention relates to improvements in couplings of the type wherein one section of a sleeve-like tubular member is connectable with the end portion of the second component and another section of the sleeve-like member has one or more flexible elastic prong-like or analogous coupling elements which can engage one or more protuberances on the end portion of the first tubular component. Such couplings further comprise a second tubular member which cooperates with the one section of the sleeve-like member to sealingly confine the end portion of the second tubular component.

Commonly owned U.S. Pat. No. 4,682,798 granted July 28, 1987 to Heinz Sauer discloses a hose coupling wherein the sleeve-like member is made of a plastic material and has a first section provided with ribs and extending into the end portion of a hose and a second section which is devoid of ribs and extends into the end portion of a pipe. The prong-shaped coupling elements are integral with a median portion of the sleeve-like member and engage an external protuberance of the pipe in assembled condition of the coupling. The latter further comprises a ring-shaped sealing element between the end portion of the pipe and the respective section of the sleeve. A drawback of such couplings is that the sleeve-like member is complex an expensive. In view of its complexity, such sleeve-like member can be made at an acceptable cost only from a thermoplastic material in a specially designed injection molding or like machine.

OBJECTS OF THE INVENTION

An object of the invention is to provide a coupling, particularly a hose coupling, which can establish a highly satisfactory sealing action between the end portions of two tubular components an can be mass produced at a low cost.

Another object of the invention is to provide a hose coupling with a sleeve-like tubular member which can be made from any one of a variety of different materials or from several different materials.

A further object of the invention is to provide a hose coupling wherein the means for sealing the interior of an end portion of one tubular component from the atmosphere is produced in a novel and improved way.

An additional object of the invention is to provide a novel and improved method of providing the sleeve-like member of the above outlined coupling with one or more elastically deformable coupling elements.

Still another object of the invention is to provide a novel and improved combination of tubular members for use in the above outlined coupling.

A further object of the invention is to provide a hose coupling wherein the hose can be sealingly engaged by the parts of the coupling in a novel and improved way.

An additional object of the invention is to provide a hose coupling which can be assembled and taken apart as often as desired without affecting its sealing action.

SUMMARY OF THE INVENTION

The invention is embodied in a coupling which is used to establish a separable fluidtight connection between neighboring end portions of first and second tubular components, particularly between a nipple at one end of a metallic or plastic pipe and an end portion of a flexible elastic hose. The improved coupling comprises a substantially sleeve-like first tubular member having a first tubular section serving to at least partially receive the end portion of the first component, and a separately produced second section which is preferably form-lockingly connected with the first section and is receivable, at least in part, in the end portion of the second component. The first section comprises a substantially ring-shaped portion which is provided with a plurality of flexible coupling elements each separably engageable with the end portion of the first component, and the coupling further comprises a second tubular member which serves to surround and clamp the end portion of the second component around the second section of the first tubular member.

The end portion of the first component can be provided with at least one external protuberance which is engageable by the preferably prong-like coupling elements of the first section upon insertion of the end portion of the first component into the first section.

The coupling further comprises at least one annular sealing element (such as an O-ring) which serves to surround the end portion of the first component within one section of the first tubular member. The one section is preferably provided with an internal annular groove for the at least one sealing element. For example, the second section of the first tubular member can be provided with a circumferential corrugation which defines the internal groove for the sealing element. The first section can be provided with a second portion which surrounds and form-lockingly engages the corrugation of the second section. Such second portion can constitute a corrugation which is complementary to the corrugation of the second section.

At least the ring-shaped portion of the first section can be made of a metallic material and can include or constitute a washer having a radially outermost portion which is integral with the coupling elements. Such washer can be disposed in a plane which is substantially normal to the axis of the first tubular member, and the coupling elements can extend in substantial parallelism with the axis of the first tubular member. These preferably prong-like coupling elements can be bent from the plane of the washer to positions in which they are substantially parallel to the axis of the first tubular member.

The ring-shaped portion of the first section of the first tubular member can be confined between a circumferential corrugation of the second section and the second tubular member when the second section is received in the end portion of the second component.

The coupling elements can be provided with openings for discrete external protuberances of the end portion of the first component. Alternatively, the free ends of the preferably prong-like coupling elements can be provided with inwardly extending portions (e.g., in the form of lugs) which are engageable with at least one external protuberance of the end portion of the first component.

The novel features which are considered as characteristic of the invention are set forth in particular in the appended claims. The improved hose coupling itself, however, both as to its construction and the mode of assembling and dismantling the same, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
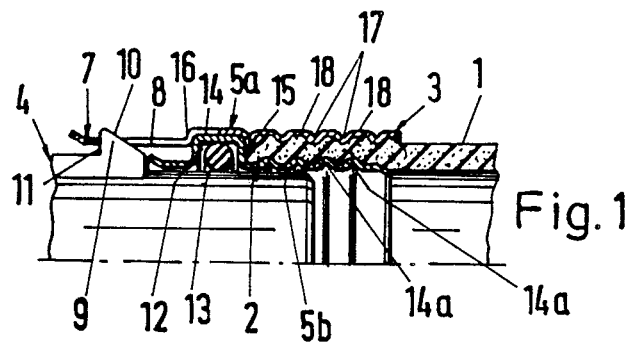
FIG. 1 is a fragmentary axial sectional view of an assembled hose coupling which embodies one form of the invention and wherein each coupling element of the first tubular member separably engages a discrete toothlike protuberance at the exterior of the end portion of the first component.

The coupling which is shown in FIG. 1 is used to establish a separable fluidtight connection between an end portion 4 of a first tubular component (e.g., the nipple at one end of a metallic or plastic pipe) and the adjacent end portion of a second tubular component 1, particularly a flexible hose. The coupling comprises a first tubular member 2 (hereinafter called sleeve for short) having a substantially tubular first section 5a which surrounds a portion of or the entire nipple 4, and a separately produced tubular second section 5b which is form-lockingly connected with the first section 5a and extends, at least in part, into the end portion of the hose 1. The coupling further comprises a deformable second tubular member 3 (hereinafter called clamping member) which surrounds the end portion of the hose 1 and clamps it against the confined portion of the section 5b. The left-hand end of the section 5b extends into the right-hand end of the section 5a, and the latter comprises a substantially ring-shaped portion 15 which can be said to resemble or constitute a washer and the radially outermost part of which is integral with several substantially axially parallel elastic coupling elements 7 in the form of elastic prongs. FIG. 1 merely shows a single coupling element 7 but the section 5a is preferably provided with several coupling elements which are equidistant from each other in the circumferential direction of the sleeve 2.

Each coupling element 7 has an opening 8 (e.g., in the form of an elongated slot, which can receive a discrete external tooth-shaped protuberance 9 of the nipple 4 when the latter is properly received in the sleeve 2. Each protuberance 9 has a first flank 10 which slopes gradually toward the free end of the nipple 4, and a second flank 11 which extends substantially radially of the nipple 4 and engages the internal surface in the foremost end portion of the opening 8 in the respective coupling element 7 to thereby hold the nipple 4 against extraction from the sleeve 2. While the nipple 4 is being pushed into the sleeve 2, the outwardly bent free ends of the coupling elements 7 ride along the flanks 10 of the respective protuberances 9 until the free ends of the elements 7 are free to move radially inwardly so that the tips of the protuberances penetrate into the respective openings 8 and thereby lock the nipple 4 in the sleeve 2. The mutual spacing of neighboring protuberances 9 at the exterior of the nipple 4 in the circumferential direction of the sleeve 2 matches the mutual spacing of the coupling elements 7.

The second section 5b of the sleeve 2 has a circumferentially complete internal annular groove 12 for an annular sealing element 13 (e.g., an 0-ring) which bears against the peripheral surface of the nipple 4 between the protuberances 9 and the end face of the nipple. The groove 12 is defined by a circumferential corrugation 14 of the second section 5b, and such corrugation is adjacent the ring-shaped portion 15 of the first section 5a. The portion 15 is confined between the adjacent portion of the corrugation 14 and the left-hand end portion of the clamping member 3 in assembled condition of the hose coupling. The corrugation 14 has a substantially U-shaped cross-sectional outline and is disposed axially between the portion 15 of the section 5a and a radially inwardly extending bend 16 of each coupling element 7. It can be said that the rightmost portions of the coupling elements 7 jointly constitute an interrupted corrugation which conforms to and surrounds adjacent portions of the corrugation 14. The two corrugations establish or form part of the aforementioned form-locking connection between the sections 5a and 5b of the sleeve 2.

The sleeve 2 can be made of metallic sheet stock having a thickness less than that of the nipple 4. However, it is also possible to make the sleeve 2 of a plastic material, e.g., a thermoplastic substance. Furthermore, it is possible to make the section 5a of elastically deformable metallic material and to make the section 5a of a more readily deformable elastic or ductile material. It is further possible to make one of the sections 5a, 5b of a plastic material and to make the other section of a metallic material.

That part of the section 5b which extends into the end portion of the hose 1 is provided with one, two or more corrugations 14a which alternate (as seen in the axial direction of the sleeve 2) with corrugations 17 of the clamping member 3. The feature that the radially innermost portions of the corrugations 17 are located opposite radially outermost portions of corrugations 14a ensures that the end portion of the hose 1 is securely clamped between the member 3 and that part of the section 5b which is confined in the end portion of the hose. If the dimensions of the corrugations 14a and 17 are identical or nearly identical, the radially outermost portion 18 of each corrugation 17 is preferably located opposite the innermost portions of two nearest corrugations 14a and vice versa (as seen in the axial direction of the sleeve 2).

The improved coupling is assembled as follows:

The first step involves insertion of the section 5b of the sleeve 2 into the section 5a. At such time, the coupling elements 7 are without bends 16 and the section 5b is without corrugations 14a. Insertion of the section 5b into the section 5a is completed when the corrugation 14 abuts the ring-shaped portion 15. The next step involves deformation of the coupling elements 7, namely the making of bends 16 so that the sections 5a, 5b are form-lockingly connected to each other. The coupling member 3 (which is without corrugations 18) is placed around the end portion of the hose 1, and the section 5b is introduced into the end portion of the hose, e.g., to an extent such that the end face of the hose abuts the ring-shaped portion 15 of the section 5a. The section 5b is thereupon provided with corrugations 14a simultaneously with the making of corrugations 17 in the deformable (e.g., ductile) clamping member 3. Such corrugations are made by resorting to readily available rolling tools or in any other suitable way.

The sealing element 13 can be introduced into the groove 12 at any time prior to insertion of the nipple 4 into the sleeve 2. Care should be exercised to ensure that each coupling element 7 is in line with one of the protuberances 9 during insertion of the nipple 4 into the subassembly including the sections 5a, 5b of the sleeve 2 and the end portion of the hose 1. This guarantees that the coupling elements 7 are automatically flexed radially outwardly while their front end portions ride along the sloping flanks 10 of the respective protuberances 9. The assembling operation is completed when the nipple 4 is received in the sleeve 2 to an extent which is necessary to permit the coupling elements 7 to snap radially inwardly so that each opening 8 receives a portion of the respective protuberance 9 so that the flanks 11 then hold the nipple against extraction from the sleeve. Each protuberance 9 is preferably further provided with a substantially radially extending stop face which serves as an abutment for the leftmost part of the section 5b when the protuberances extend into the respective openings 8 so that the nipple 4 and the sleeve 2 are held against axial movement in either direction (except as a unit). The sealing element 13 undergoes at least some deformation as a result of insertion of the nipple 4 into the sleeve 2 so that it establishes a reliable seal between the nipple and the internal surface of the circumferentially complete corrugation 14. At the same time, the end portion of the hose 1 is sealingly clamped between the member 3 and the section 5b so that the properly assembled coupling is fluidtight.

If it should become necessary to dismantle the coupling, the free ends of the coupling elements 7 are pushed radially outwardly so that the openings 8 are moved outwardly of and away from the respective protuberances 9. The nipple 4 is then readily extractable from the sleeve 2. The sleeve 2 and the nipple 4 can be attached to or separated from each other as often as desired.

Figure 2:
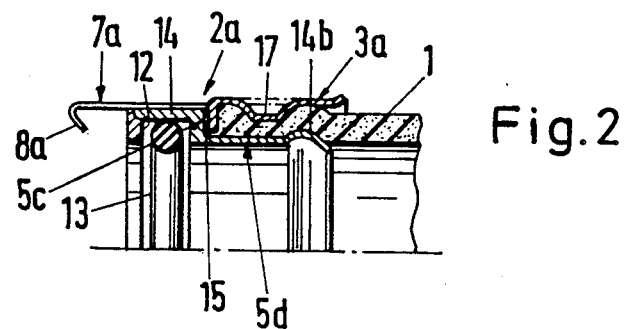
FIG. 2 is a similar fragmentary axial sectional view of a modified hose coupling, with the first component omitted.

FIG. 2 shows a portion of a second hose coupling wherein the first tubular component (including a nipple 4 or the like) is omitted. The sleeve 2a of this coupling comprises a first tubular section 5c and a separately produced second tubular section 5d which is form-lockingly connected with the section 5c. A portion of the section 5d is received in the end portion of the second tubular component 1, preferably a hose which is made of elastically deformable material.

The prong-like coupling elements 7a of the section 5c have hook-shaped free ends 8a which can ride over the flanks 10 of the respective protuberances 9 during introduction of a nipple into the sleeve 2a and which thereupon engage the radially extending flanks 11 of the respective protuberances. Since the coupling elements 7a are not formed with openings, discrete tooth-shaped protuberances 9 of the nipple 4 can be replaced with a circumferentially complete external annular protuberance which is of advantage if the nipple of the first tubular component need not be inserted into the sleeve 2a in a selected angular position. The number of coupling elements 7 or 7a equals n wherein n is one or a multiple of one. As mentioned above, if the sleeve 2 or 2a has two or more coupling elements 7 or 7a, such coupling elements are preferably equidistant from each other in the circumferential direction of the sleeve. This is particularly desirable if the coupling elements have openings (8) for discrete (e.g., tooth-shaped) protuberances 9 at the exterior of the first tubular component.

The section 5c of the sleeve 2a can be made from a flat star-shaped blank wherein the coupling elements 7a are initially coplanar with and extend radially outwardly from the substantially washer-like portion 15. The plane of the portion 15 is or can be normal or substantially normal to the axis of the assembled sleeve 2a. The coupling elements 7a are thereupon bent through approximately 90° so that they extend in substantial parallelism with the axis of the thus obtained section 5c and are integral with the radially outermost part of the portion 15.

The section 5d of the sleeve 2a has a single corrugation 14b which is adjacent its right-hand axial end. The convex side of the corrugation 14b is in deforming engagement with the adjacent part of the end portion of the hose 1.

The clamping member 3a of the hose coupling which is shown in FIG. 2 has a single corrugation 17 which is located between the corrugation 14b and the ring-shaped or washer-like portion 15. The latter is clamped between the clamping member 3a and the circumferentially complete corrugation 14 of the section 5d. The corrugation 17 is formed after the clamping element 3a is slipped onto the end portion of the hose 1.

When the section 5d is in the process of being introduced into the section 5c, the hook-shaped free end portions 8a of the coupling elements 7a ride over the corrugation 14, and the insertion is completed when the corrugation 14 abuts the ring-shaped portion 15. The coupling elements 7a can snap radially inwardly, so that they are substantially parallel with the axis of the sleeve 2a, as soon as the corrugation 14 advances beyond the free end portions 8a. In the next step, the section 5d is inserted into the end portion of the hose 1. The clamping member 3a is thereupon deformed so that its leftmost portion constitutes an inwardly extending collar which abuts the portion 15 so that the latter is confined between the collar of the deformed clamping member 3a and the corrugation 14. This ensures that the section 5c is held against axial movement relative to the section 5d and clamping member 3a. The corrugation 14 can be formed prior to, simultaneously with, or subsequent to making of the corrugation 17.

The material of the section 5c may but need not be the same as the material of the section 5d. As shown, the thickness of the corrugation 14 can be greater than the thickness of the right-hand part of the section 5d, and the leftmost portion of the corrugation 14 can be formed as a separate part which is thereupon affixed to the remaining portion of this corrugation.

An advantage of the improved coupling is that the sections 5a, 5b or 5c, 5d of the sleeve 2 or 2a can be mass-produced at a low cost and that the cost of the composite sleeve can be reduced still further by making one of the sections (such as the section 5b or 5d) of a material which is less expensive than the material of the other section (5a or 5c). Moreover, it is simpler to properly relate the diameter of the section 5a or 5c to the diameter of the nipple 4, and to properly relate the diameter of the section 5b or 5d to the diameter of the hose 1 if the two sections of the composite sleeve are produced separately and are thereupon assembled preparatory to insertion of the nipple 4.

Another advantage of the improved coupling is that the properly shaped section 5b or 5d of the composite sleeve automatically provides a groove 12 for the sealing element 13. This also contributes to lower cost of the coupling. In addition, the corrugation 14 can form part of the means for form-lockingly connecting the sections 5a, 5b or 5c, 5d to each other. In the embodiment of FIG. 1, the other part of the form-locking connection is the interrupted corrugation which is formed as a result of providing the coupling elements 7 with bends 16. In the embodiment of FIG. 2, the form-locking connection is established by the corrugation 14 in cooperation with the ring-shaped portion 15 and the adjacent radially inwardly extending collar of the clamping member 3a.

The embodiment of FIG. 2 exhibits the additional advantage that the first section 5c can be made from a flat blank which can be mass-produced in a stamping or like machine. All that is necessary is to bend the coupling elements 7a from the plane of the ring-shaped portion 15 into substantial parallelism with the axis of the thus obtained first tubular section 5c.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A coupling for establishing a separable fluidtight connection between end portions of first and second tubular components, particularly between an end portion of a first component in the form of a pipe and an end portion of a hose, comprising a substantially sleeve-like first tubular member having a first tubular section arranged to at least partially receive the end portion of the first component and a separately produced second section form-lockingly connected with said first section and receivable at least in part in the end portion of the second component, said first section comprising a substantially ring-shaped first portion provided with a plurality of flexible coupling elements separably engageable with the end portion of the first component; a second tubular member arranged to surround and clamp the end portion of the second component around said second section; and at least one annular sealing element arranged to surround the end portion of the first component within said second section, said second section having a circumferential corrugation defining an internal groove for said at least one sealing element and said first section having a second portion which surrounds and form-lockingly engages said corrugation.

2. The coupling of claim 1 for establishing a separable connection between end portions of first and second tubular components wherein the end portion of the first component has at least one external protuberance, said coupling elements including prongs which are engageable with the protuberance upon insertion of the end portion of the first component into said first section.

3. A coupling for establishing a separable fluidtight connection between end portions of first and second tubular components, particularly between an end portion of a first component in the form of a pipe and an end portion of a hose, comprising a substantially sleeve-like first tubular member having a first tubular section arranged to at least partially receive the end portion of the first component and a separately produced second section form-lockingly connected with said first section and receivable at least in part in the end portion of the second component, said first section comprising a substantially ring-shaped portion provided with a plurality of flexible coupling elements separably engageable with the end portion of the first component; a second tubular member arranged to surround and clamp the end portion of the second component around said second section; and at least one annular sealing element arranged to surround the end portion of the first component within said second section, said second section having a circumferential corrugation defining an internal groove for said at least one sealing element, the first section of said first member including a corrugation complementary to the corrugation of said second section.

4. A coupling for establishing a separable connection between end portions of first and second tubular components, particularly between an end portion of a first component in the form of a pipe and an end portion of a hose, comprising a substantially sleeve-like first tubular member having a first tubular section arranged to at least partially receive the end portion of the first component and a separately produced second section form-lockingly connected with said first section and receivable at least in part in the end portion of the second component, said first section comprising a substantially ring-shaped portion provided with a plurality of flexible coupling elements separably engageable with the end portion of the first component, said ring-shaped portion consisting of a metallic material and including a washer having a radially outermost portion integral with said coupling elements; and a second tubular member arranged to surround and clamp the end portion of the second component around said second section.

5. The coupling of claim 4, wherein said washer is disposed in a plane extending substantially at right angles to the axis of said first tubular member and said coupling elements extend in substantial parallelism with the axis of said first tubular member.

6. The coupling of claim 5, wherein said coupling elements are prongs which are bent from said plane to positions of substantial parallelism with the axis of said first tubular member.

7. A coupling for establishing a separable connection between end portions of first and second tubular components, particularly between an end portion of a first component in the form of a pipe and an end portion of a hose, comprising a substantially sleeve-like first tubular member having a first tubular section arranged to at least partially receive the end portion of the first component and a separately produced second section form-lockingly connected with said first section and receivable at least in part in the end portion of the second component, said first section comprising a substantially ring-shaped portion provided with a plurality of flexible coupling elements separably engageable with the end portion of the first component and said second section having a circumferential corrugation; and a second tubular member arranged to surround and clamp the end portion of the second component around said second section, said ring-shaped portion being confined between said corrugation and said second tubular member when said second section is received in and said second tubular member surrounds the end portion of the second component.

8. A coupling for establishing a separable connection between end portions of first and second tubular components, particularly between an end portion of a first component in the form of a pipe having discrete external protuberances and an end portion of a hose, comprising a substantially sleeve-like first tubular member having a first tubular section arranged to at least partially receive the end portion of the first component and a separately produced second section form-lockingly connected with said first section and receivable at least in part in the end portion of the second component, said first section comprising a substantially ring-shaped portion provided with a plurality of flexible coupling elements separably engageable with the end portion of the first component, said coupling elements having openings for discrete external protuberances on the end portion of the first component; and a second tubular member arranged to surround and clamp the end portion of the second component around said second section.

9. A coupling for establishing a separable connection between end portions of first and second tubular components, particularly between an end portion of a first component in the form of a pipe having at least one external protuberance thereon and an end portion of a hose, comprising a substantially sleeve-like first tubular member having a first tubular section arranged to at least partially receive the end portion of the first component and a separately produced second section form-lockingly connected with said first section and receivable at least in part in the end portion of the second component, said first section comprising a substantially ring-shaped portion provided with a plurality of flexible coupling elements separately engageable with the end portion of the first component, said coupling elements having inwardly extending end portions engageable with at least one external protuberance on the end portion of the first component; and a second tubular member arranged to surround and clamp the end portion of the second component around said second section.

* * * * *